(12) United States Patent
Masson (10) Patent No.: US 9,919,302 B2
(45) Date of Patent: Mar. 20, 2018

(54) COATING TOOL (71) Applicant: UMICORE AG & CO. KG, Hanau-Wolfgang (DE)

(72) Inventor: Stéphane Masson, Village Neuf (FR)

(73) Assignee: UMICORE AG & CO. KG, Hanau-Wolfgang (DE)

( * ) Notice: Subject to any disclaimer, the term of this patent is extended or adjusted under 35 U.S.C. 154(b) by 0 days.

(21) Appl. No.: 15/124,839

(22) PCT Filed: Mar. 23, 2015

(86) PCT No.: PCT/IB2015/000388
§ 371 (c)(1),
(2) Date: Sep. 9, 2016

(87) PCT Pub. No.: WO2015/140630
PCT Pub. Date: Sep. 24, 2015

(65) Prior Publication Data
US 2017/0021345 A1   Jan. 26, 2017

(30) Foreign Application Priority Data

Mar. 20, 2014 (EP) .................. 14160879

(51) Int. Cl.
*B05C 7/04* (2006.01)
*B01J 37/02* (2006.01)
(Continued)

(52) U.S. Cl.
CPC .......... *B01J 37/0215* (2013.01); *B01J 35/04* (2013.01); *B05B 1/18* (2013.01); *B05B 1/34* (2013.01); *B05C 7/04* (2013.01); *B05C 3/09* (2013.01); *B05C 13/02* (2013.01); *B05D 7/22* (2013.01); *B05D 2259/00* (2013.01)

(58) Field of Classification Search
CPC .... B01J 37/0215; B01J 35/04; B01J 37/0234; B01J 37/02; B01J 33/00; B05C 7/04; B05C 13/00; B05C 13/025; B05C 13/02; B05C 3/09; B05B 1/34; B05B 1/18; B05B 1/14; B05D 2259/00; B05D 7/22
USPC ....... 118/50, 408, 429, 500, 503; 29/890.08; 425/405.1

See application file for complete search history.

(56) References Cited

U.S. PATENT DOCUMENTS 4,039,482 A   8/1977 Hoyer et al.
4,191,126 A   3/1980 Leal et al.
(Continued)

FOREIGN PATENT DOCUMENTS

DE       19781838 B4     8/2008
DE    102007012928 A1    9/2008
(Continued)

OTHER PUBLICATIONS

International Search Report for PCT/IB2015/000388, dated Jul. 29, 2015 in English and Language.
(Continued)

Primary Examiner — Laura Edwards
(74) Attorney, Agent, or Firm — Smith, Gambrell & Russell, LLP (57) ABSTRACT

This application concerns a tool for coating a monolithic shaped catalyst. The tool is part of a coating station and serves to hold and fix the monolith while coating is progressing.

6 Claims, 6 Drawing Sheets

(51) Int. Cl.
    *B01J 35/04*            (2006.01)
    *B05B 1/18*             (2006.01)
    *B05B 1/34*             (2006.01)
    *B05C 3/09*              (2006.01)
    *B05C 13/02*           (2006.01)
    *B05D 7/22*             (2006.01)

(56) References Cited

U.S. PATENT DOCUMENTS

| | | |
|---|---|---|
| 4,550,034 A | 10/1985 | Shimrock et al. |
| 6,149,973 A | 11/2000 | Foerster et al. |
| 6,478,874 B1 | 11/2002 | Rosynsky et al. |
| 6,548,105 B2 | 4/2003 | Kiessling et al. |
| 6,627,257 B1 | 9/2003 | Foerster et al. |
| 6,753,294 B1 | 6/2004 | Brisley et al. |
| 2002/0178707 A1 | 12/2002 | Vance et al. |
| 2008/0107806 A1 | 5/2008 | Mergner et al. |
| 2010/0093527 A1 | 4/2010 | Hasselmann |
| 2012/0321537 A1 | 12/2012 | Mergner et al. |

FOREIGN PATENT DOCUMENTS

| | | |
|---|---|---|
| EP | 0428990 A1 | 5/1991 |
| EP | 2415522 A1 | 2/2012 |
| EP | 2533901 A1 | 12/2012 |
| JP | 2002028499 * | 1/2002 |
| WO | 97/48500 | 12/1997 |
| WO | 99/47260 | 9/1999 |
| WO | 2011/080525 A1 | 7/2011 |

OTHER PUBLICATIONS

Written Opinion of the International Searching Authority for PCT/IB2015/000388, dated Jul. 29, 2015 in English Language.

\* cited by examiner

Prior Art Design        Inventive Design

Fig. 12

COATING TOOL

This application concerns a tool for coating a monolithic shaped carrier. The tool is part of a coating station and serves to hold and fix the monolith body while coating is progressing.

Automotive exhaust abatement is of great importance as numbers of cars are growing tremendously, especially in East Asia countries. Several clean air acts around the world try to keep the pollution of the air by automobiles at respective levels. More and more stringent legislation in this regard forces car manufacturers and suppliers to apply techniques for abatement of noxious pollutants stemming from internal combustion engines of vehicles. One area of techniques concerns the catalytic combustion of exhaust pollutants on or in so called honeycomb monoliths either of the flow-through or in the wallflow type.

Normally such monolith bodies are made out of e.g. metal or cordierite and have to be coated by a layer being active in catalytically destroying the noxious pollutants in the exhaust under driving conditions. A great improvement has been achieved by chemically modifying the catalytically active layers with respect to the main reactions of the pollutants under oxidative or reductive exhaust environment. A second approach is to apply certain coating strategies in order to gain an activity as high as possible with the material at hand. Hence, several patent applications already deal with processes and devices to coat said monolithic carriers. E.g. the following selection of patent publications, respectively, highlight aspects of such processes, like coating apparatus, methods for coating, or special units of a coating station (WO9947260A1; U.S. Pat. Nos. 4,550,034; 4,039,482; WO9748500A1; U.S. Pat. No. 6,478,874B1; US20020178707A1; DE19781838T1; WO2011080525A1; U.S. Pat. Nos. 4,191,126; 6,627,257B1; 6,548,105B2; US20080107806A1; U.S. Pat. Nos. 6,149,973; 6,753,294B1).

In order to further improve the coating of said monolithic bodies (short: the monolith) methods for coating have to be provided that allow to precisely coat the monolith in question in as minimum time as possible in order to secure a high activity while pushing down production costs.

This object can be achieved by applying special diffusors within coating tools located in the coating chamber of a respective coating unit. The coating tool of present invention comprises:

a first means (1) for reversible holding and fixing a catalyst monolith to be coated with a washcoat;

a second means (2) to control the inflow of the washcoat into the monolith; said second means (2) being attached to said first means (1) such that during the coating process said second means (2) comes into contact with the washcoat before it reaches the monolith;

said second means (2) having the form of a plate comprising holes (3) having, when in use, an inlet side towards the washcoat and an outlet side towards the monolith, and channels providing a communication from the inlet side to the outlet side for the washcoat to flow through;

wherein at least part of said channels have an asymmetric channel width along their axis being wider at the washcoat inlet side than at a point within the channels and wherein said asymmetric holes (3) are wider at the washcoat outlet side than at a point within the channels and the area which is more narrow than outlet and inlet of the holes (3), is at least for some of the holes (3) aligned more closely to the outlet than to the inlet side.

By applying such a coating tool the washcoat to be coated on or in the monolith walls is first forced to flow through the asymmetric holes (3) of the second means (2) before it contacts the monolithic carrier body. The asymmetric holes (3) achieve a more even distribution of the washcoat zone inside the monolithic carrier body and enable to speed up the progress of the coating step to a considerable extent. At the end of the day more catalysts being in spec can be produced leading to a shortening of the costs per piece.

In a preferred embodiment the asymmetric holes (3) of the second means (2) show a special shape towards the outlet side. Said holes (3) are wider at the washcoat outlet side than at a point within the channels. Outlet in this connection means the side of the second means (2) which is orientated towards the monolith when in use. The inlet of the second means (2) is thus orientated towards the washcoat reservoir. In that the width of holes (3) is narrowed in an area between the outlet and the inlet of said second means (2), the washcoat while being pumped through the holes (3) is accelerated and decelerated again. This diffusor type of action helps to mitigate turbulences which otherwise might render the fast coating process undesirable. In a very preferred embodiment the area which is more narrow than outlet and inlet of the holes (3) forms a cylindrical surface to the inner periphery of the channels and being located within the second half of the channels seen from the inlet side.

Figure 1:
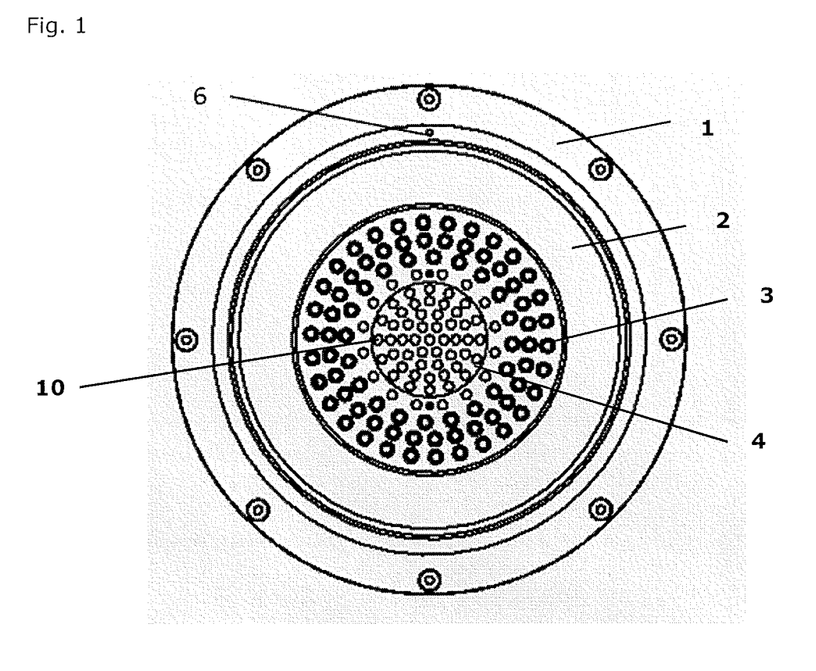
FIG. 1 shows the tool from the monolith (outlet) side
Figure 2:
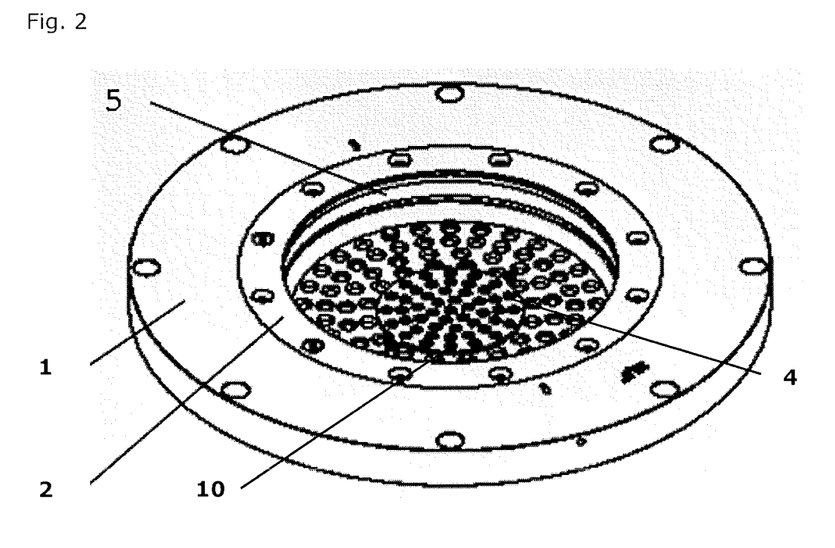
FIG. 2 shows top-side view on the tool
FIG. 3 displays bottom-side view on the tool
FIG. 4 reflects bottom view on tool
Figure 3:
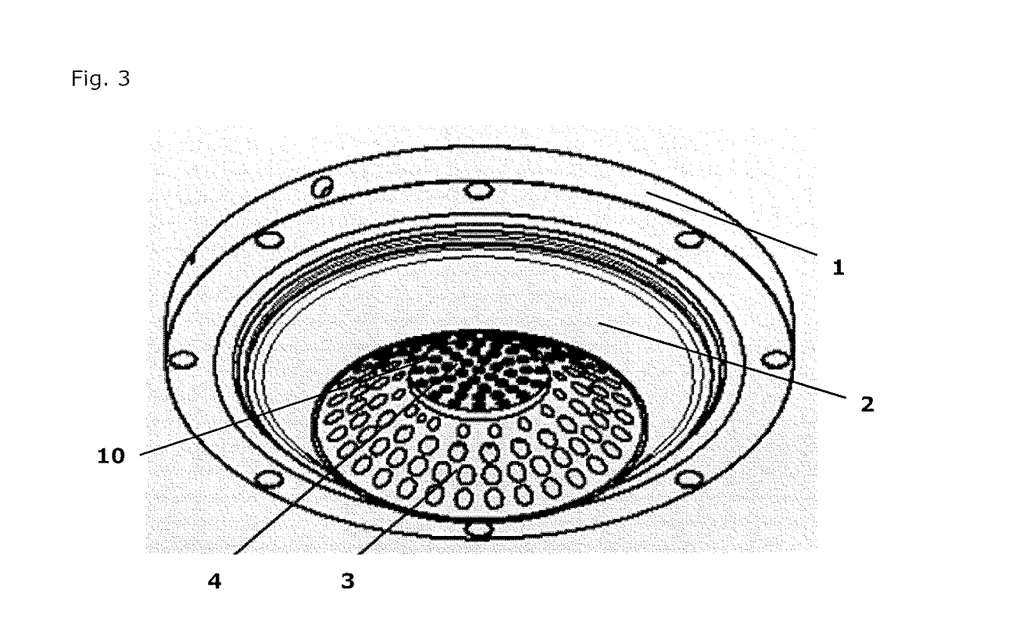
Figure 4:
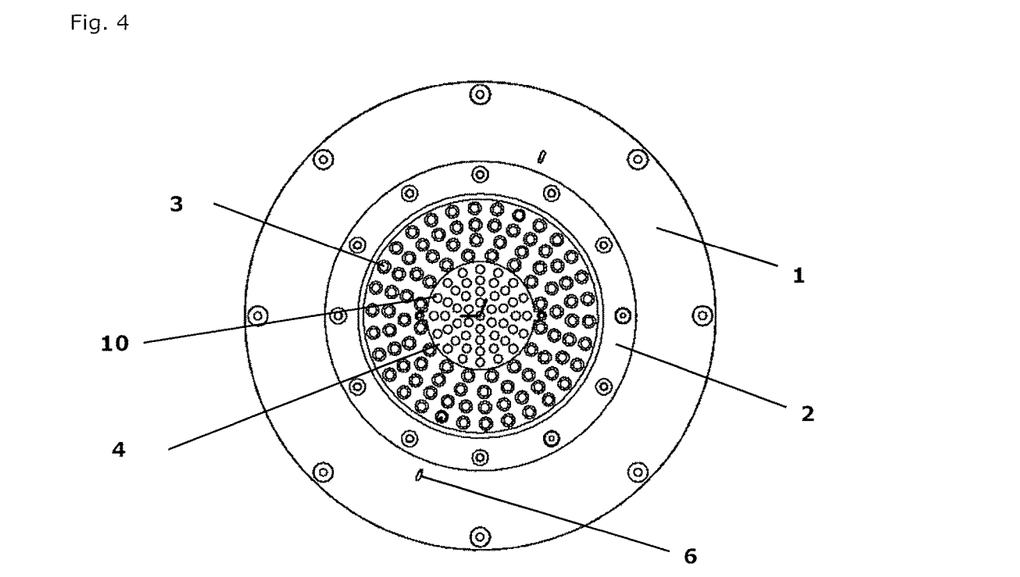
Figure 5:
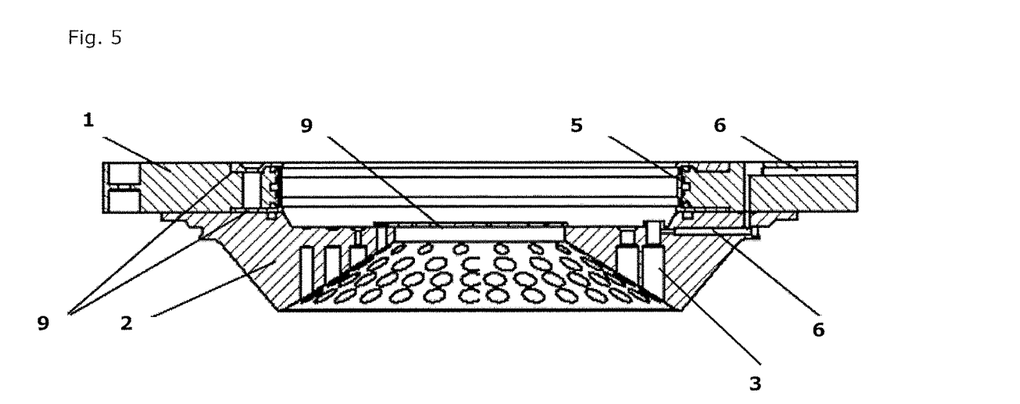
FIG. 5 shows side cut view of tool

For reasons of functionality it may be the case that a flap is positioned in proximity below the coating tool of the present invention. The flap opens or closes the communication to the low-pressure reservoir to which superfluous washcoat is sucked after the coating process. The flap can be a round plate. When the flap opens it may hit the coating tool though. For this reason the coating tool on the inlet side (towards the flap) may have a concave-like shape in order to give enough space to the opening flap (FIG. 3). For this reason the inner sphere of the second means (2) may advantageously comprise a disk (4). Hence, preferably only at the outer periphery of the second means (2) asymmetric holes (3) are located (FIG. 1).

Thus, said second means (2) advantageously comprises a concentrical area having a smaller diameter compared to the diameter of the second means (2) itself and being attached thereto, said area being a disk (4) perforated by preferably uniform holes (10), preferably a flat perforated disk. The disk area is attached to the second means (2) by measures known in the art, e.g. through screws or damps or may form one part with the second means (2).

Figure 8:
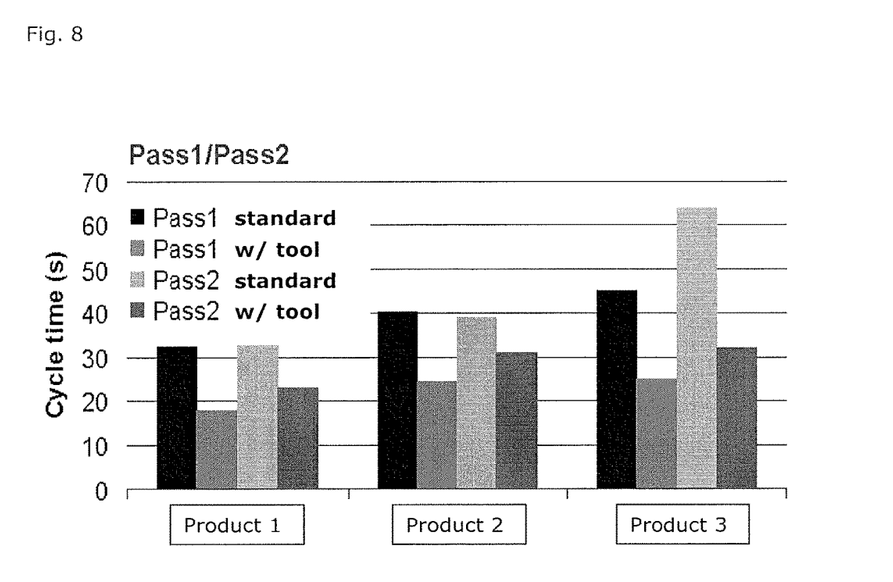
Figure 9:
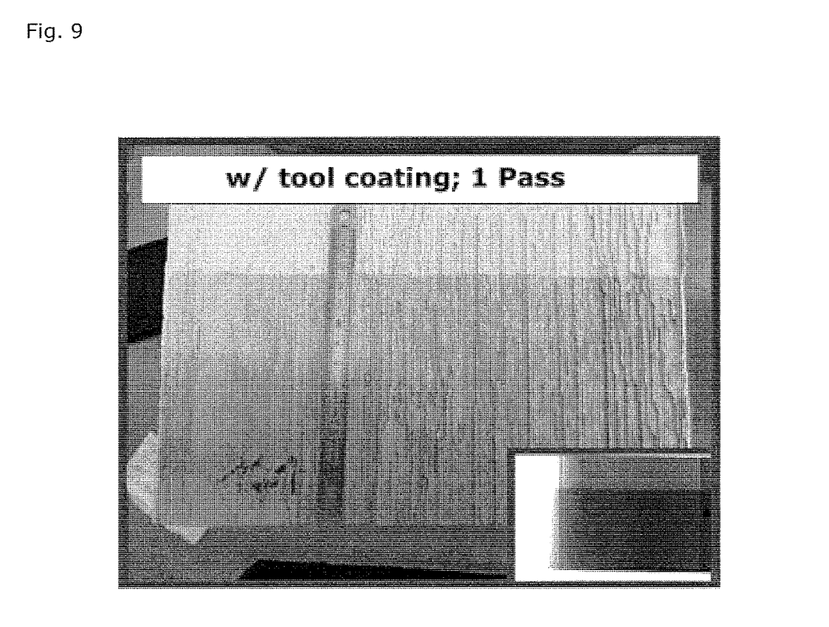

The second means (2) as described above is attached to the first means (1) and somehow shields the monolith against the washcoat. While being pumped towards the monolith, the washcoat can only enter the space between the monolith and the second means (2) through the holes of the second means (2) and preferably the holes of flat disk (4) [holes (3) and preferably (10), respectively] thereby experiencing a regional acceleration and deceleration by holes (3) leading, finally, to more uniform washcoat level inside the coating chamber and thus to more uniform ends of a coating zone (FIG. 9) in the monolith in less coating time (FIG. 8).

In order to have an opportunity for an in-process-control, in a further preferred embodiment the tool has at least one hole having asymmetric channel width (3) being wider at the washcoat inlet side than at a point within the channels, and is prepared to receive a sensor finger (6) for monitoring the execution of the coating process. Measured is the washcoat level in the coating tool in order to know when the washcoat reached the probe; this level is point zero for pumping the washcoat at a precise amount into the monolith to achieve a precise height of the washcoat zone in the monolith to be coated if so desired. The sensor finger (6) can be any sensor known to the skilled worker or selected from the group consisting of conductivity, capacity and optical sensors. The sensor is coupled to a controlling unit which steers the progression of the coating process. Preferably a coating station as depicted in EP2533901A1 is used in this connection. The skilled worker knows how to arrange the hard- and software working in conjunction.

The first means (1) of the coating tool is equipped with a device to hold and fix a monolithic carrier body. This function is reversible so that a carrier can be arrested in the first means (1) before the coating step is going to start and be released after coating is over. It is obvious for the skilled person that the holding means should be such that no washcoat can escape the coating tool but through the monolithic carrier itself. To ensure this said first means (1) comprises an inflatable bellow (5) which is able to reversibly hold and fix the monolithic carrier body through inflating and deflating the bellow (5). The bellow (5) can be composed out of e.g. any rubber-like material being air-proof.

Figure 6:
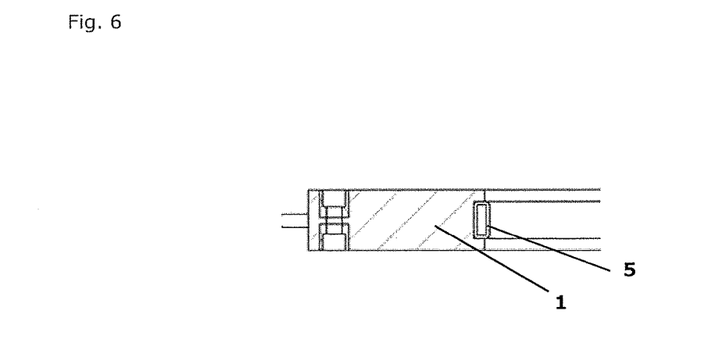
FIG. 6 depicts zoomed side cut view of preferred bellow region
Figure 7:
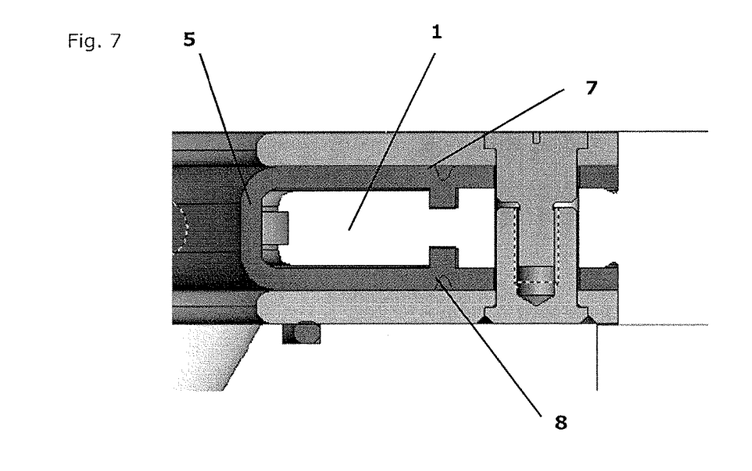

In a preferred embodiment the bellow (5) is fixed to the first means (1) in such a way as to press against the first means (1) on the one side and to the monolith on the other side while being inflated and inflation is done by pumping gas to the in-side of the inflatable bellow (5) like pumping up a bicycle tube. After the coating step is done deflating the bellow (5) allows the monolith to be released from the coating tool (FIG. 6). A further preferred embodiment is directed to the possibility to take a rubber-like material which is fixed to the first means (1) by air-tight engagement on an upper side (7) and a lower side (8) of the first means (1) while the thus formed bellow is open to the side of the first means (1). Here the gas is pumped into the space between the bellow and the first means (1) when inflating the bellow (FIG. 7).

Figure 10:
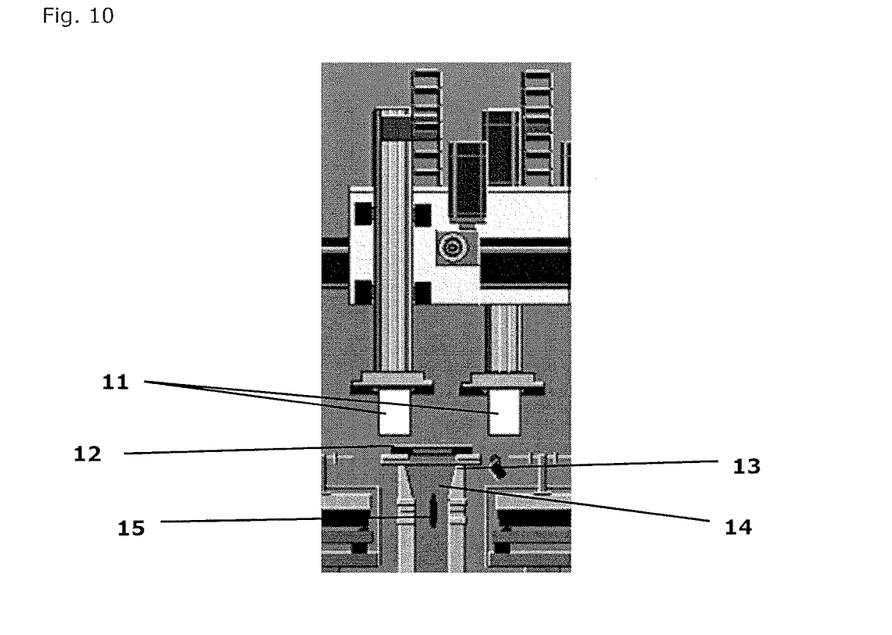

FIG. 10 shows a part of a coating station. Monolithic bodies (11) are carried from one end to the coating chamber (13) comprising the coating tool (12) and further to the next unit (e.g. weighing or drying). Washcoat is going to be pumped from below (14) upwards and through the coating tool (12) when a monolith (12) is arrested in the tool (12). After coating is done the monolith body is released from the coating tool and progressed to the next operating unit.

Results of implementation of new coating tool:
Same zone length tolerance when compared to standard tooling
Similar axial/radial coating gradient compared to standard
Similar performance compared to standard (200° C.-500° C. engine bench test)
Greatly improved cycle times (time per coating 20%-50% less; FIG. 7)

EXAMPLES

Figure 11:
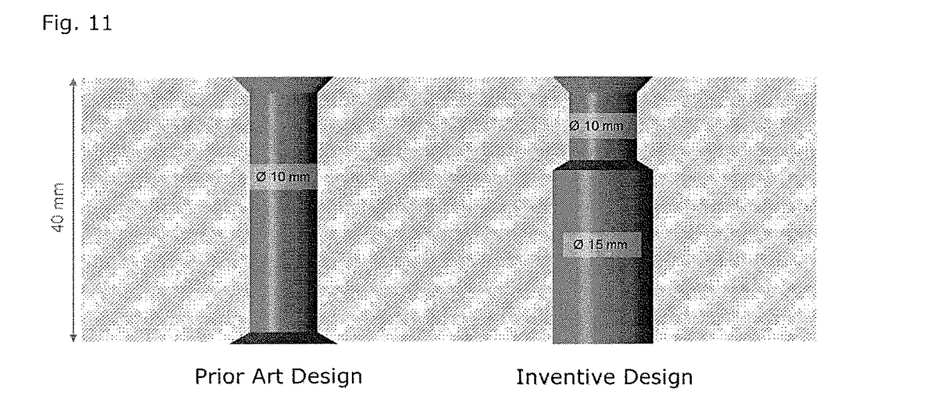

By way of a simulation based on the channel design depicted in FIG. 11 a CFD (Computational Fluid Dynamics) calculation was performed using the commercially available Ansys Fluent software package (http://www.ansys.com/Products/Simulation+Technology/Fluid+Dynamics/Fluid+Dynamics+Products/ANSYS+Fluent). The calculation is based on the Navier-Stokes equation.

The results of the calculation made for the channels shown in FIG. 11 are presented by the following table 1.

TABLE 1

| Result (at 1 cm after diffusor): | | |
|---|---|---|
| | 250 l/h by hole | 500 l/h by hole |
| Low viscosity washcoat (Density ~1000 kg/m3) | Prior Art design speed 4% higher. | Prior art design speed 2% higher |
| Washcoat with higher viscosity (Density ~1600 kg/m3) | Prior art design speed 6% higher | Prior art design speed 13% higher |

Figure 12:
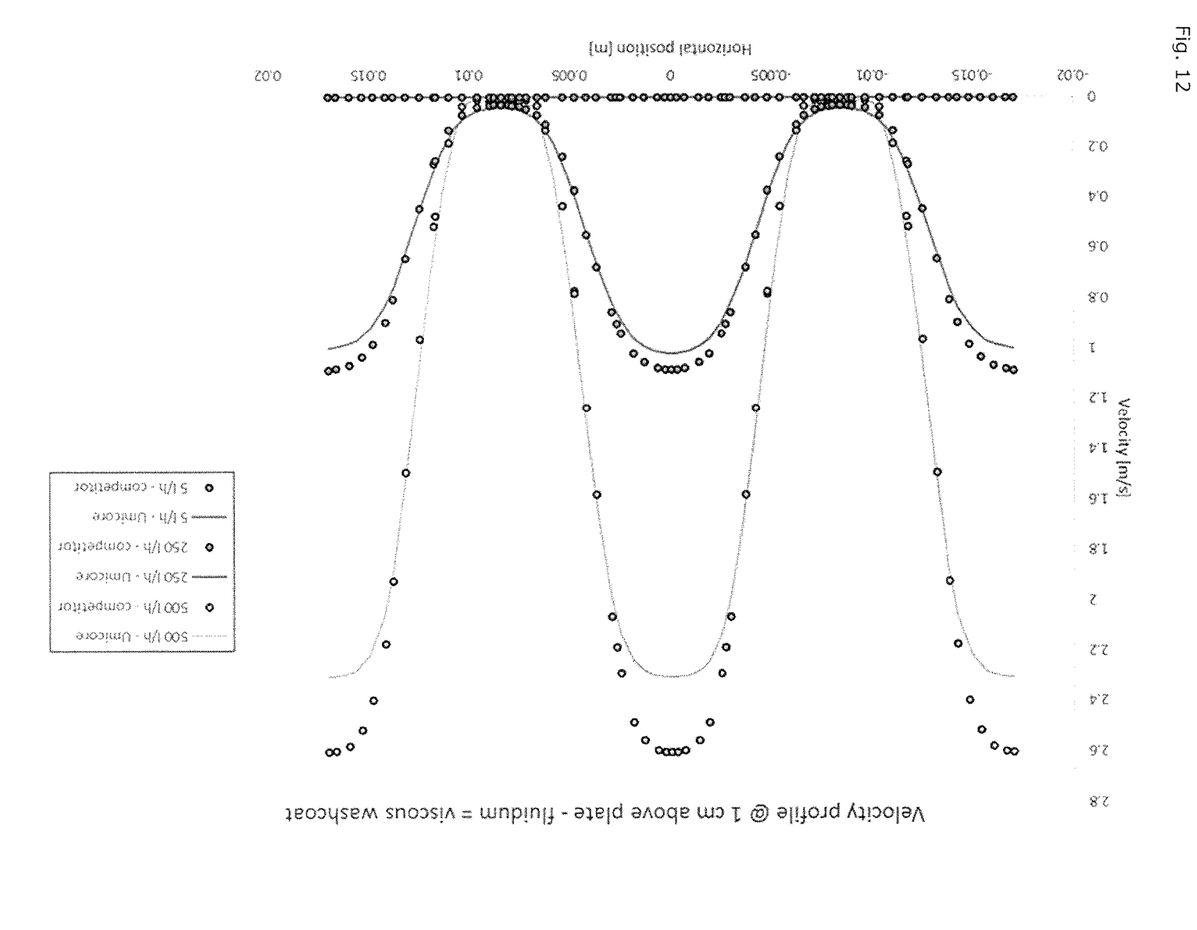

As can be seen the velocity with which the washcoat exits the channels is in each case higher than in the case of the inventive channel design. This means that the washcoat exiting the channels has a lower tendency to flatten when introduced into the coating chamber with higher velocity and speed. This is in particular noticeable if the density of the washcoat increases. In FIG. 12 the simulated values for both embodiments are presented within a chart showing the velocity-distribution over the outlet surface of the channels for both scenarios. The velocity at a distance from the surface of 1 cm is always less in the inventive design compared with the design of the prior art channels. This results into a more flattened filling of the coating chamber or more filling speed that can be used with channels of the invention.

NUMERALS

1 First means (1)
2 Second means (2)
3 Holes with asymmetric width
4 Concentrical area disk
5 Bellow
6 Provision for sensor finger
7 Upper side of bellow attachment
8 Lower side of bellow attachment
9 Clamps
10 Holes of concentrical area disk
11 Monolith bodies before and after coating in coating chamber
12 Applied coating tool
13 Coating chamber
14 Space where washcoat is pumped up and down
15 flap
FIG. 7 depicts zoomed side cut view of preferred bellow region
FIG. 8 time saving through application of tool for three different products; pass 1 means that the monolith is coated 1 time; pass 2 indicates that coating is done 2 times
FIG. 9 side cut of monolith body coated with diffusor tool
FIG. 10 shows part of the coating station with coating chamber
FIG. 11 Prior art design of diffusors and inventive design used for calculation
FIG. 12 Result of calculation showing preferable behavior of the inventive design over the prior art design

The invention claimed is:

1. A coating tool comprising:
a first means for reversibly holding and fixing a catalyst monolith to be coated with a washcoat;
a second means to control an inflow of the washcoat into the monolith;
the second means being attached to the first means such that during the coating process the second means comes into contact with the washcoat before the washcoat reaches the monolith;
the second means having the form of a plate comprising holes having, when in use, an inlet side towards the washcoat and an outlet side towards the monolith, and channels providing a communication from the inlet side to the outlet side for the washcoat to flow through, wherein
at least some of the channels have a non-uniform channel width along an axis extending in the flow direction whereby the channel width is wider at both the inlet side and the outlet side as compared to a narrowed area between the inlet and outlet sides, and
for at least some of the channels, the narrowed area is aligned more closely to the outlet side than to the inlet side.

2. The tool according to claim 1, wherein
the narrowed area forms a cylindrical surface at the inner periphery of the channel and is located within a half of the channel that is closer to the outlet side than to the inlet side.

3. The tool according to claim 1, further comprising
a disk attached concentrically with the second means, the disk having a smaller diameter than the second means and comprising holes.

4. The tool according to claim 1, wherein
at least one hole having a non-uniform channel width is configured to receive a sensor finger.

5. The tool according to claim 1, wherein
the first means comprises an inflatable bellow configured to reversibly hold and fix the catalyst monolith via inflation and deflation of the bellow.

6. The tool according to claim 5, wherein
the bellow is fixed to the first means by an air-tight engagement at an upper side and a lower side of the first means, and the bellow is open to a lateral side of the first means.

* * * * *